United States Patent [19]

Herbst et al.

[11] Patent Number: 4,929,337

[45] Date of Patent: May 29, 1990

[54] PROCESS FOR CATALYTIC CRACKING OF HEAVY HYDROCARBON FEED TO LIGHTER PRODUCTS

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 292,205

[22] Filed: Dec. 30, 1988

[51] Int. Cl.$^5$ .................. C10G 11/05; C10G 35/095; C07C 2/12; C07C 5/22

[52] U.S. Cl. .................. 208/120; 208/135; 502/67; 585/407; 585/739

[58] Field of Search .................. 208/120, 70, 74; 585/322, 330, 407, 430, 477, 739; 502/67

[56] References Cited

U.S. PATENT DOCUMENTS

| | | | |
|---|---|---|---|
| 3,855,115 | 12/1974 | Morrison | 585/407 |
| 3,928,172 | 12/1975 | Davis, Jr. et al. | 208/77 |
| 4,005,048 | 1/1977 | Dowden et al. | 585/477 |
| 4,035,285 | 7/1977 | Owen et al. | 288/120 |
| 4,080,395 | 3/1978 | Butter | 585/407 |
| 4,260,839 | 4/1981 | Chen et al. | 585/407 |
| 4,447,552 | 5/1984 | Hayes et al. | 502/41 |
| 4,612,298 | 9/1986 | Hettinger et al. | 502/65 |
| 4,647,368 | 3/1987 | McGuiness et al. | 208/70 |
| 4,686,312 | 8/1987 | Chu et al. | 585/315 |
| 4,766,265 | 8/1988 | Desmond et al. | 585/418 |
| 4,794,095 | 12/1988 | Walker et al. | 502/64 |
| 4,826,586 | 5/1989 | Herbst et al. | 208/70 |
| 4,834,867 | 5/1989 | Gilson | 585/739 |

*Primary Examiner*—Anthony Mc Farlane
*Attorney, Agent, or Firm*—Alexander J. McKillop; Charles J. Speciale; Malcolm D. Keen

[57] ABSTRACT

A catalytic cracking catalyst mixture and process are disclosed. The mixture comprises (a) a cracking catalyst containing a matrix and a large pore molecular sieve and (b) separate additive catalysts comprising at least one of a shape selective paraffin cracking/isomerization zeolite and a shape selective aliphatic aromatization zeolite. An exemplary catalyst mixture comprises Dealuminized zeolite Y, optionally containing rare earth elements in an alumina-rich matrix, an additive catalyst of HZSM-5 in a matrix, and an additional additive catalyst of gallium ZSM-5 in a matrix. The alumina-rich matrix of the cracking catalyst acts as a sodium and metals sink. The large pore molecular sieve catalyst cracks large hydrocarbons to lighter paraffins and olefins. The shape selective paraffin cracking/isomerization component cracks/isomerizes the paraffins produced by the large pore molecular sieve. The shape selective aliphatic aromatization catalyst converts light paraffins and olefins into aromatics. A single shape selective zeolite, e.g., ZSM-5 with a controlled amount of an aromatization component such as gallium, may promote both paraffin cracking/isomerization and aromatization. The additive catalylsts have physical properties, e.g., size, shape, density and attrition resistance which are substantially the same as the cracking catalyst.

3 Claims, 1 Drawing Sheet

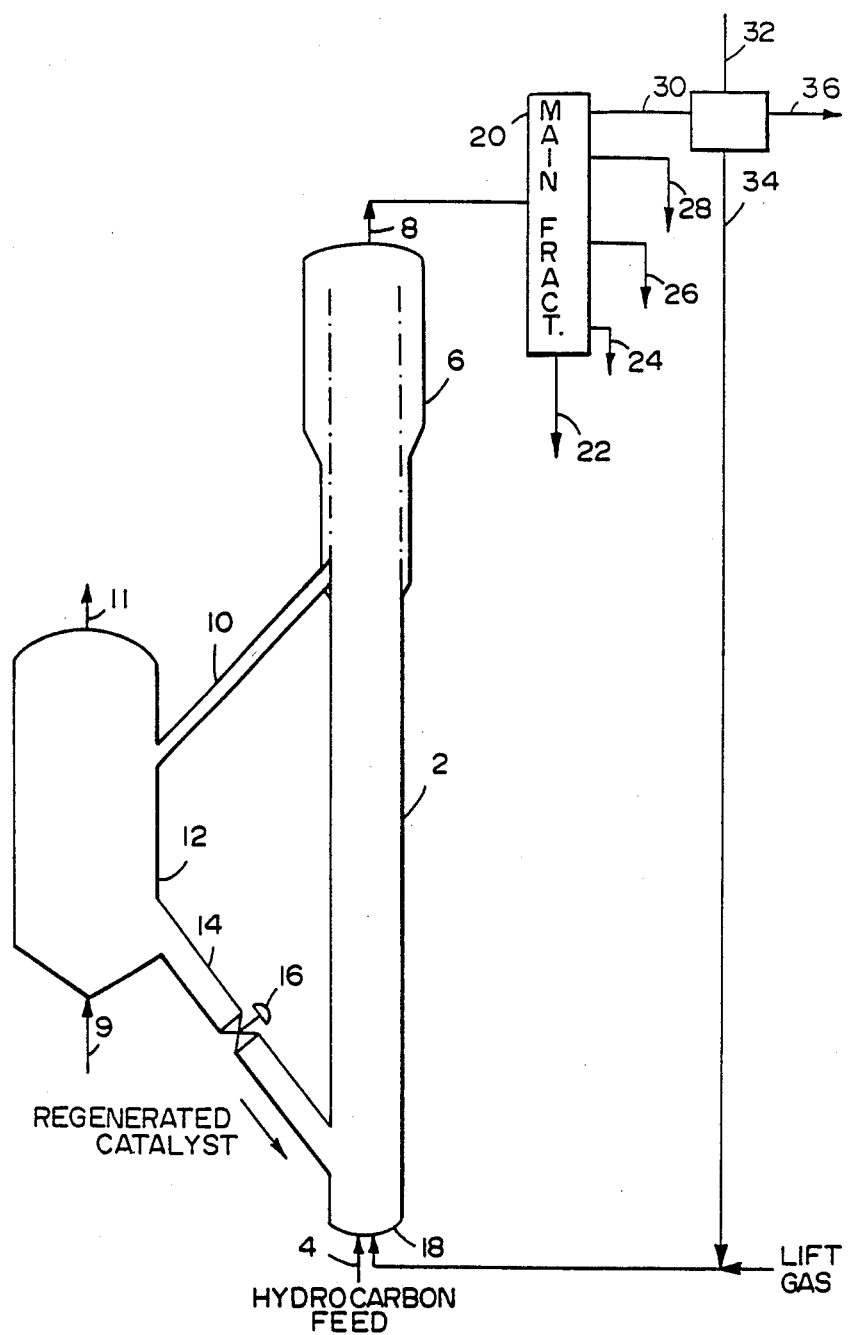

PROCESS FOR CATALYTIC CRACKING OF HEAVY HYDROCARBON FEED TO LIGHTER PRODUCTS

FIELD OF THE INVENTION

This invention relates to catalytic cracking of heavy hydrocarbon oils to produce liquid hydrocarbons boiling in the gasoline and distillate range.

BACKGROUND OF THE INVENTION

The present invention can best be understood in the context of its contribution to conventional FCC processes. Accordingly, a brief discussion of conventional cracking processes and catalysts follows.

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units, the hot regenerated catalyst is added to the feed at the base of a riser reactor. The fluidization of the solid catalyst particles may be promoted with a lift gas. Mixing and atomization of the feedstock may be promoted with steam, equal to 1-5 wt % of the hydrocarbon feed. Hot catalyst (650° C.+) from the regenerator is mixed with preheated (150°-375° C.) charge stock. The catalyst vaporizes and superheats the feed to the desired cracking temperature usually 450°-600° C. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products pass to product separation. Typically, the cracked hydrocarbon products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst rich solids portion of the settled product may be recycled to the reactor. The clarified slurry oil is a heavy product.

The "reactor vessel" into which the riser discharges primarily separates catalyst from cracked products and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537, 4,118,337, 4,118,338, 4,218,306 (Gross et al); 4,444,722 (Owen); 4,459,203 (Beech et al); 4,639,308 (Lee); 4,675,099, 4,681,743 (Skraba) as well as in Venuto et al, Fluid Catalytic Cracking With Zeolite Catalysts, Marcel Dekker, Inc. (1979). The entire contents of these patents and publication are incorporated herein by reference.

Conventional FCC catalysts usually contain finely divided acidic zeolites comprising, e.g., faujasites such as Rare Earth Y (REY), Dealuminized Y (DAY), Ultrastable Y (USY), Rare Earth Containing Ultrastable Y (RE-USY), and Ultrahydrophobic Y (UHP-Y).

Typically, FCC catalysts are fine particles having particle diameters ranging from about 20 to 150 microns and an average diameter around 60-80 microns.

Catalyst for use in moving bed catalytic cracking units (e.g. TCC units) can be in the form of spheres, pills, beads, or extrudates, and can have a diameter ranging from 1 to 6 mm.

Although many advances have been made in both the catalytic cracking process, and in catalyst for use in the process, some problem areas remain.

The catalytic cracking process is excellent for converting heavy hydrocarbons to lighter hydrocarbons. Although this conversion is the whole reason for performing catalytic cracking, the boiling range of the cracked product is frequently not optimum for maximum profitability. Usually the gasoline and fuel oil boiling range fractions are the most valuable materials. Light olefins ($C_2$-$C_{10}$ olefins) are highly valuable only if a refiner has a way to convert these olefins into gasoline boiling range materials via e.g. alkylation, or if these light olefins can be used for their petrochemical value. Light paraffins, $C_{10}^-$ materials, are generally not as valuable because of their relatively low octane. The very light paraffins, particularly propane, usually are not as valuable as gasoline. There are ever more stringent limitations on the allowable vapor pressure of gasoline, such that refiners can not blend as much light material into the gasoline as they would like to. Accordingly, there is great interest in converting "top of the barrel" components, or light hydrocarbons in the $C_{10}^-$ boiling range, into heavier products.

There is also a growing need in refineries to convert more of the "bottom of the barrel" or resid fractions into lighter components via catalytic cracking. Many FCC units today add 5-15 wt % resid, or non-distillable feed, to the catalytic cracking unit. Such heavy materials in the past were never considered as suitable feeds for catalytic cracking units, because of their high levels of Conradson Carbon, sodium, and dehydrogenation metals such as nickel and vanadium. The market for resids (bunker fuel oil, road asphalt) is so limited that refiners have turned to FCC as one way to upgrade the value of the resid fraction.

The most limiting factor in catalytic cracking of resids in conventional FCC units appears to be metals deposition on the catalyst. The nickel and vanadium in the resid deposit almost stoichiometrically on the FCC circulating catalyst inventory, leading to production of excessive amounts of "dry gas" during catalytic cracking. This problem can be ameliorated to some extent by adding metal passivators, such as antimony and/or tin, passivate the nickel and vanadium components deposited on the catalyst due to processing of resid feed.

Usually refiners are also forced to resort to very high levels of catalyst withdrawal and replacement, to maintain the metals levels on the catalyst at a tolerable level, and to maintain catalyst activity. This represents a large daily expense (for make-up catalyst) and presents a disposal problem because the spent catalyst has so much heavy metal on it.

Attempts have been made to modify catalytic cracking catalyst to accomodate heavy feeds. It is known that commerically available FCC catalysts with a high surface area, and an alumina rich matrix, are more resistant to deactivation from metals contamination than other FCC catalysts (Speronello, B. K. and Reagan, W. J., *Oil and Gas Journal*, January 30, 1984, page 139). See also "Method Predicts Activity of Vanadium-Contaminated FCC Catalyst", E. L. Leuenberger, *Oil and Gas Journal*, July 15, 1985, page 125.

Another approach to metals passivation is disclosed in U.S. Pat. No. 4,372,841, incorporated herein by reference. Adding a hydrogen donor material to the reaction zone and passing catalyst through a reduction zone at high temperature at least partially passivates the catalyst.

Vanadium, when deposited on a catalyst, is fairly mobile and can migrate to zeolite sites, attack the zeolite and destroy it. This phenomenon was discussed in "Metals Resistant FCC Catalyst Gets Field Test," Jars, Dalen, *Oil and Gas Journal*, September 20, 1982, Page 135.

Although catalyst manufactures are working on catalysts which apparently can tolerate fairly high levels of metals, and thus permit conversion of more of the "bottom of the barrel" into light products, they have largely ignored the economically related problem of converting light materials, produced during cracking, into more valuable, heavier components.

We have discovered a multi component cracking catalyst mixture, and a catalytic cracking process using this mixture, which is metals tolerant and permits significant changes in the product distribution from catalytic cracking. We have discovered a way to efficiently convert, in conventional catalytic cracking units, the "bottom of the barrel" into more valuable products, and, in a preferred embodiment, also convert the relatively low value "top of the barrel" materials (incidentally produced during cracking) into more valuable products boiling in the gasoline range. Our catalyst mixture also allows some control of the amount of "top of the barrel" conversion that occurs.

BRIEF SUMMARY OF THE INVENTION

Accordingly, the present invention provides a catalytic cracking catalyst comprising a physical mixture of separate particles of a bulk conversion cracking catalyst containing at least one component with an equivalent pore size of at least about 7 angstroms in a matrix, said bulk conversion cracking catalyst having physical properties which permit use in a fluidized or moving bed catalytic cracking reactor; a light paraffin upgrading catalyst comprising at least one zeolite having a constraint index of 1-12 and paraffin cracking/isomerization activity; and, a light paraffin upgrading catalyst comprising at least one zeolite having a constraint index of 1-12 and paraffin aromatization activity; and wherein said upgrading catalysts have substantially the same physical properties as the bulk conversion cracking catalyst.

In another embodiment, the present invention provides a process for catalytic cracking of a feed of hydrocarbons boiling in the gas oil and heavier boiling range to lighter products by contacting the feed at catalytic cracking conditions with a cracking catalyst comprising a mixture of separate particles of: a bulk conversion cracking catalyst containing at least one component with an equivalent pore size of at least about 7 angstroms in a matrix, said bulk conversion cracking catalyst having physical properties which permit use in a fluidized or moving bed catalytic cracking reactor; a light paraffin upgrading catalyst comprising at least one zeolite having a constraint index of 1-12 and paraffin cracking/isomerization activity; and, a light paraffin upgrading catalyst comprising at least one zeolite having a constraint index of 1-12 and paraffin aromatization activity; and wherein said upgrading catalysts have substantially the same physical properties as the bulk conversion cracking catalyst.

In yet another embodiment, the present invention provides a process for catalytic cracking of a feed of hydrocarbons boiling in the gas oil and heavier boiling range to lighter products including gasoline and light olefins in a riser cracking reactor by contact with a circulating inventory of catalytic cracking catalyst and wherein the light olefins produced during catalytic cracking are converted in the riser reactor to additional gasoline boiling range components, and wherein the gasoline product produced by cracking in the riser reactor is upgraded in the riser reactor to increase its octane number comprising: contacting said feed with catalyst mixture comprising a cracking catalyst containing at least one of a large pore molecular sieve in a matrix, and separate paricles of additive catalysts having essentially the same physical properties as the cracking catalyst, said additive catalysts comprising (1) a shape selective zeolite having a constraint index of 1-12, being substantially free of hydrogenation/dehydrogenation components, and having paraffin cracking/isomerization activity in a matrix and (2) a shape selective zeolite having a constraint index of 1-12 and paraffin aromatization selectivity in a matrix; determining the aromatic content of the gasoline fraction produced; and adjusting the amount of the paraffin cracking/isomerization additive catalyst relative to the amount of the paraffin aromatization additive catalyst in the circulating catalyst inventory to change the aromaticity of the gasoline fraction produced during riser cracking.

BRIEF DESCRIPTION OF THE DRAWING

FIG. 1 is a schematic diagram of a conventional FCC reactor and regenerator.

DETAILED DESCRIPTION OF THE DRAWING

FIG. 1, is a schematic flow diagram of an exemplary FCC unit. Feed is charged to the bottom of the riser reactor 2 via inlet 4. Hot regenerated catalyst is added via conduit 14, equipped with a flow control valve 16. A lift gas is introduced near the liquid and solid feed inlets via conduit 18. The riser reactor is an elongated, cylindrical smooth-walled tube.

The feed vaporizes and forms a dilute phase suspension with the FCC catalyst. The suspension passes up the riser, which generally gets wider to accomodate volumetric expansion. Cracked products and coked catalyst may pass into a solid-vapor separation means, such as a conventional cyclone. Preferably, the riser has a deflector and a short residence time stripper, as disclosed in U.S. Pat. No. 4,629,552 (Hadded and Owen) incorporated by reference. Another good design is the closed cyclone design disclosed in U.S. Pat. No. 4,749,471 (Kam et al) which is incorporated by reference. A means for stripping entrained hydrocarbons from the catalyst is usually provided in the base of vessel 6. Neither this stripping section, nor the solid-gas separation equipment is shown in the drawing for clarity. Such equipment is conventional. Cracked products are withdrawn from the reactor by conduit 8.

Stripped catalyst containing coke is withdrawn via conduit 10 and charged to regenerator 12. The catalyst is regenerated by contact with an oxygen-containing gas, usually air added via line 9. Flue gas is withdrawn from the regenerator by line 11.

Usually the feed temperature is about 150° C. to 375° C. The regenerator operates at about 650° C. to 750° C. and the catalyst to feed weight ratio is usually about 3:1 to 10:1, adjusted as necessary to hold a reactor outlet of about 450° C. to 550° C.

Cracked product from the FCC unit passes from outlet 8 to main fractionator 20, where product is separated into a heavy slurry oil stream 22, heavy distillate 24, light distillate 26, naphtha 28, and a light overhead stream 30, rich in C2-C4 olefins, C1-C4 saturates, and other light cracked gas components. This light stream is usually treated in an unsaturated gas plant 32 to recover various light gas streams, including C3-C4 LPG, and optionally $C_2^-$ fuel gas or the like.

Preferably a light, $H_2$ rich gas stream is recycled from the gas plant via line 34 for use as all, or part, of a lift gas used to contact catalyst in the base of riser 2.

The catalyst and process of the present invention work very well in the conventional FCC units described above, and in TCC units. The maximum benefit from the present invention is achieved when a heavy, metals containing residual feed is at least part of the feed to the catalytic cracking unit.

DETAILED DESCRIPTION OF PREFERRED EMBODIMENTS

Each important parameter of the process will be discussed. Those parts of the process which are conventional will receive only brief mention. The following will be considered:
1. Feedstocks
2. Catalyst Mixture
3. Bottom of the Barrel Catalyst (e.g., REY in matrix)
4. Top of the Barrel Catalyst (e.g., ZSM-5 in a matrix)
5. Catalyst Physical Properties
6. FCC Reactor Conditions
7. Stripping
8. Catalyst regeneration (e.g., w/air)
9. Catalyst reactivation (e.g., w/olefins)
10. Catalyst Manufacture

FEEDSTOCK

Most FCC and TCC units crack gas oil or vacuum gas oil feeds, i.e., those having an initial boiling point above 400°-500° F., and an end boiling point above 750°-850° F.

The feed can include any conventional feed for catalytic cracking units. Typically such feeds are gas oils or vacuum gas oils. Preferably the feed comprises a wholly or partly non-distillable fraction, e.g. 650° C.+ boiling range material. Resids, deasphalted resids, tar sands, shale oils, coal liquids and similar heavy material, may be used as part or all of the feed.

CATALYST MIXTURE

The catalyst mixture used herein contains at least two different molecular sieve components and a matrix component. Preferably, three different molecular sieve components and a matrix are used for a total of four components. The preferred catalyst mixtures perform four different functions. We may refer to these catalyst mixtures hereafter as "quadro" catalysts.

The quadro catalyst comprises at least one component for bulk conversion, i.e., doing most of the conversion of heavy feed and "bottom of the barrel" to light components (including "top of the barrel" components). This bulk conversion component can be a conventional FCC catalyst, e.g., USY in a silica-alumina clay matrix or a non-conventional FCC catalyst, e.g., a large pore aluminophosphate in a matrix comprising large pore pillared clays.

Other components comprise shape selective zeolites having a Constraint Index of 1-12 which upgrade or convert the "top of the barrel" to more valuable products.

The shape selective zeolite components are present in the mixture as separate particle additive catalysts which have physical properties, e.g., size, shape, density and a friction resistance which are substantially the same as the bulk conversion catalyst.

Accordingly, the catalyst mixture comprises:

(A) "Bottom of the Barrel" Bulk Conversion Catalyst:
   (1) A matrix, preferably containing alumina
   (2) A large pore molecular sieve, preferably containing one component from the zeolite Y family (B) "Top of the Barrel" Separate Particle Additive Catalysts:
   (3) A shape selective paraffin cracking/isomerization zeolite, preferably HZSM-5, in a matrix
   (4) A shape selective aliphatic aromatization zeolite, preferably GaZSM-5, in a matrix.

The function of the matrix and large pore molecular sieve in the "Bottom of the barrel" bulk conversion catalyst will be discussed first, followed by a discussion of the "Top of the barrel" separate particle additive catalysts which contain the shape selective zeolites.

Bottom of the Barrel Conversion Catalyst

Bottom of the barrel conversion involves a catalyst comprising a matrix and at least one large pore cracking component.

Matrix

The matrix can be conventional. The function of the matrix in catalytic cracking catalyst is well known. Briefly stated, it protects the relatively soft and fragile molecular seive components from physical damage. The matrix acts to some extent as a sodium and metals sink, and minimizes localized high temperatures when burning coke from the molecular sieve.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, molecular sieves materials have been incorporated into naturally occurring clays, e.g., bentonite and kaolin.

In addition to the foregoing materials, the zeolite or molecular sieve for use herein can be composited with a porous matrix material such as silica-alumina, silica-magnesium, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

The preferred matrix material, alumina, functions not only as a conventional matrix but also acts in the present invention as an efficient metals getter or sink. Preferably a relatively soft, highly porous alumina, is used. Metals tend to deposit on the alumina, and the gradual attrition of the alumina permits metals to be removed from the unit with catalyst "fines". Other metal getters, e.g., BaO, MgO, CaO, $La_2O_3$, $Ce_2O_3$ and similar alkaline and/or rare earth compounds may be present as part of the matrix, or as a separate additive catalyst.

Large Pore Cracking Component

The large-pore molecular sieve cracking component may be a conventional zeolite. Some of these, and patents describing their preparation are discussed hereinafter. Zeolite X, zeolite Y, and preferably higher silica forms of zeolite Y such as Dealuminized Y (DAY Y; U.S. Pat. No. 3,442,795; Ultrastable Y (USY; U.S. Pat. No. 3,449,070), Ultrahydrophobic Y (UHP-Y U.S. Pat. No. 4,331,694; U.S. Pat. No. 4,401,556), silicon substituted Y and similar materials are preferred for use herein. Zeolite beta (B, U.S. Pat. No. 3,308,069) or Zeolite L (U.S. Pat. No. 3,216,789; U.S. Pat. No. 4,544,539; U.S. Pat. No. 4,554,146 and U.S. Pat. No. 4,701,315) may also be used. These materials may be subjected to conventional treatments, such as impregnation or ion exchange with rare earths to increase stability. These patents are incorporated herein by reference.

These large-pore molecular sieves have a geometric pore opening of about 7 angstroms in diameter. In current commerical practice, most of the cracking of large molecules in the feed is done using these large pore molecular sieves.

Very Large Pore Cracking Component

In addition to the large-pore cracking components described above which have found extensive use commercially, several recently developed very large-pore cracking components may also be used. All of these materials have an equivalent pore size greater than 7 Angstroms. Some are molecular sieves (such as VPI-5) while others are not (expanded clays).

VPI-5 is a molecular sieve with pores larger than about 10 Angstrom units in diameter. It is an aluminophosphate sieve with 18-membered rings of T-atoms. They resemble the better known $AlPO_4$-5 materials. Such molecular sieves have very large pore volumes and extremely large pore openings. Such large pore sieves would be very useful for cracking the very large molecules associated with high boiling or residual fractions. VPI-5 was described by M. Davis, C. Saldarriaga, C. Montes, and J. Garces in a paper presented at "Innovations in Zeolite Materials Science" Meeting in Nieuwpoort, Belgium, September 13–17, 1987. M. E. Davis, C. Saldarriaga, C. Montes, J. Garces and C. Crowder, Nature 331, 698 (1988).

Pillared, interlayered clays or silicates may also be used as a large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica are added to smectites to increase the interplatelet distances. U.S. Pat. No. 4,515,901 and U.S. Pat. No. 4,367,163 are incorporated herein by reference.

U.S. Pat. No. 4,757,041, which is incorporated herein by reference, discloses a class of pillared interlayered clay molecular sieve products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the large pore cracking component of the present invention.

Published European Application EP 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, which have a three dimensional crystal framework of suitable size may also be used as the large pore cracking component. U.S. Pat. No. 4,440,871 and U.S. Pat. No. 4,741,892 and U.S. Pat. No. 4,689,138, which are incroporated herein by reference, disclose silicoalumino phosphate molecular sieves.

It should be emphasized that the process and catalyst of the present invention does not require the use of any single "large pore" cracking component. It is essential to have at least one cracking component, e.g., RE-USY, VPI-5, or pillared clay and mixtures thereof which has an equivalent pore diameter in excess of about 7 Angstrom units.

The "bottom of the barrel" conversion catalyst may also contain some shape selective zeolites, but for maximum effectiveness, the shape selective zeolites are in separate, elutriable particles, as discussed hereafter.

Top of the Barrel Conversion Catalyst

The shape selective paraffin cracking/isomerization component, in a particle with physical properties similar to the conventional FCC catalyst, can be any shape selective zeolite which at the conditions experienced in a catalytic cracking unit promotes formation of olefinic and/or iso-olefinic materials. Any zeolite having a constraint index of 1–12 can be used herein but ZSM-5 is especially preferred. Details of the Constraint Index test procedures are provided in J. Catalysis 67, 218–222 (1981) and in U.S. Pat. No. 4,711,710 (Chen et al), both of which are incorporated herein by reference.

Preferred shape selective zeolites are exemplified by ZSM-5, ZSM-11, ZSM-12, ZSM-23, ZSM-35, ZSM-48, ZSM-57 and similar materials.

ZSM-5 is described in U.S. Pat. No. 3,702,886, U.S. Reissue 29,948 and in U.S. Pat. No. 4,061,724 (describing a high silica ZSM-5 as "silicalite").
ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-57 is described in U.S. Pat. No. 4,046,859.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such catalysts include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ratio of 70/1, 100/1, 500/1 or even higher.

Preferably the shape selective paraffin cracking/isomerization zeolite is placed in the hydrogen form by conventional means, such as exchange with ammonia and subsequent calcination. The zeolite may be used in any form which promotes paraffin upgrading.

The shape selective zeolite can be used neat, but preferably is contained in a matrix. The matrix can be the same as that used as the matrix for the large pore molecular sieve.

The preferred, but optional shape selective aromatization component can be any zeolite having a constraint index of 1–12 and additional components which promote paraffin aromatization at catalytic cracking conditions.

Gallium is especially preferred for use herein because of its ability to convert light paraffins such as propanes and butanes into aromatic hydrocarbons which are valuable as petrochemicals or as high octane gasoline blending components. Ga may be incorporated into the zeolite framework during synthesis or it may be exchanged or impregnated or otherwise incorporated into the ZSM-5 after synthesis. Preferably 0.05 to 10, and most preferably, 0.1 to 2.0 wt % gallium is associated with the aromatization zeolite.

It is possible to use the same shape selective zeolite for both paraffin cracking/isomerization and for aromatization. Control of the acidity of the zeolite (alpha value) and of the nature and amount of the additional components which promote aromatization permits this. Partial exchange of HZSM-5 with gallium is one way to do this.

In this case, the ZSM-5 would preferably contain 0.05 to 1.0 wt % gallium. The reduced gallium content allows both paraffin cracking/isomerization and aromatization to occur.

Preferably the zeolite components (large pore molecular sieve, paraffin cracking/isomerization zeolite, and the optional aromatization zeolite) comprise 20–90 wt. % of the mixture, with the remainder being matrix. On a matrix free basis, the relative ratios of the three zeolites can vary greatly, depending on feedstocks, products desired, and to a lesser extent on catalytic cracking conditions.

In practice, the large pore molecular sieve may be an "off the shelf" zeolite in a conventional or in a custom matrix. Said large pore zeolite can be relatively simple and need not be optimized for, e.g., maximum high octane gasoline production. The exotic upgrading of the "top of the barrel" can be performed by the shape selective additive catalysts. The high silica zeolite additives are low coke producers so they do not deactivate as quickly as the conventional bulb conversion catalyst. Much of the expensive overall optimization of the cracking process can be performed using the separate particle additive catalysts, but this expense can be tolerated because these additive catalysts will retain activity longer.

In general, the function of the large pore molecular sieve cracking components is bulk conversion of heavy feed to lighter materials, including light paraffins and light olefins in the $C_2$–$C_{10}$ range.

The light paraffins are not preferred products. The $C_5^+$ paraffins tend to be relatively low in octane number. They can be upgraded by conventional means such as platinum reforming, but this increases costs. There is a significant yield loss during reforming, and reliance on reforming tends to increase the aromatics content of the gasoline pool.

The shape selective zeolite cracking/isomerization catalyst converts a significant portion of these paraffins to olefins and iso-olefins, with much higher octane number, in the case of the $C_5^+$ olefins, and much more reactivity in the case of the $C_4^-$ olefins.

The light olefins produced by the shape selective cracking/isomerization catalyst and by the large pore molecular sieve cracking catalyst can be easily upgraded in conventional alkylation units. In addition, the iso-olefins can be processed in etherification units to high octane oxygenates such as MTBE or TAME. By increasing the amount of shape selective cracking/isomerization catalyst present in the quadro catalyst, it is possible to enhance the production of $C_2$–$C_{10}$ olefins and, via subsequent alkylation or etherification steps, increase gasoline yields and octane number, with aliphatic components rather than aromatic components.

The shape selective aromatization zeolite converts $C_{10}^-$ paraffins, and especially $C_4^-$ paraffins, to aromatics. The aromatics produced, primarily benzene, toluene, and xylene (BTX) are extremely valuable both as petrochemicals or as high octane gasoline blending components.

On a matrix free basis, each component should comprise at least 1 wt. %, and preferably at least 5 wt. %, of the total zeolite content.

Preferably the conventional, large pore molecular sieve cracking component is present in an amount roughly equal to four times the combined amount of shape selective paraffin cracking/isomerization zeolite and shape selective paraffin aromatization zeolite. Thus, an elutriable catalyst mixture containing 80 wt. % RE-USY zeolite, 10 wt. % HZSM-5 and 10 wt. % GaZSM-5 (all on a matrix free basis), as measured in the riser reactor, will give very good results.

Preferably the zeolite content of the additive catalyst(s) is somewhat higher than the zeolite content of the large pore molecular sieve catalyst. Either the paraffinic cracking/isomerization additive catalyst or the aromatization additive catalyst may comprise 5-90% zeolite, but shape selective zeolite concentrations of 10-90%, and preferably 20-80%, make optimum use of the zeolite. There is no physical lower limit on shape selective zeolite concentration, but use of additive catalysts containing low concentrations of shape selective zeolite tend to dilute the large-pore molecular sieve containing catalyst (or bulk conversion catalyst) and for this reason, relatively high ZSM-5 concentrations, in excess of 20%, or even over 40%, allow "top-of-the barrel" conversion without diluting excessively the large pore molecular sieve cracking catalyst.

Integrating the above discussion, the following guidelines regarding relative amounts and formulations of catalyst mixtures can be given

| Component, Type | | Component, Wt. % (Matrix Free Basis) | |
|---|---|---|---|
| | Suitable | Preferred | Most Preferred |
| Large Pore Mol. Sieve | 40-98% | 50-95% | 50-90 |
| Paraffin Cracking/ Isomerization | 2-30% | 2.5-25% | 5-25 |
| Paraffin Aromatization | 0-30% | 2.5-25% | 5-25 |
| The zeolite/matrix ratios are: | | | |
| Large Pore Mol. Sieve | Zeolite/ Matrix | 10-60/ 40-90 | 12-40/ 60-88 | 15-25/ 75-25 |
| Paraffin Cracking/Isom. | Zeolite/ Matrix | 10-100/ 0-90 | 20-90/ 80-10 | 30-70/ 70-30 |
| Paraffin Aromatization | Zeolite/ Matrix | 10-100/ 0-90 | 20-90/ 80-10 | 30-70/ 70-30 |

CATALYST PHYSICAL PROPERTIES

The paraffin cracking/isomerization and paraffin aromatization additive catalysts should have physical properties similar to those of the large pore molecular sieve cracking catalyst. So long as the additive catalysts have fluidization properties similar to the bulk conversion cracking catalyst, the additive catalysts will simply become part of the circulating catalyst inventory in the catalytic cracking unit. No physical modifications of the unit will be necessary. Typical FCC catalysts have average particle sizes of 20-120 microns, preferably 60-80 microns.

FCC REACTOR CONDITIONS

The FCC cracking conditions include a riser top temperature from 930°-1100° F., preferably 970°-1050° F., and most preferably 985°-1025° F.; catalyst:oil weight ratios from 3-12, preferably 4-11, and most preferably 5-10; catalyst residence time of from 0.5-15 seconds, preferably 1-10 seconds.

REACTIVATION

The catalyst mixture may be reactived with a suitable reactivating medium, e.g., $H_2$ or $H_2$-rich gas, under conventional reactivation conditions, e.g., a temperature of 427° to 815° C. (800° F. to 1500° F.) or even higher and preferably 538° to 760° C. (1000° F. to 1400° F.). Preferably, the $H_2$ or $H_2$-rich gas added is hotter than the catalyst. This improves the efficiency of any stripping taking place therein. The reactivation gas may be preheated by exchange with hot regenerated catalyst or flue gas from the regenerator. The reactivation effluent gas may be combined with the other product gases. The catalyst may or may not have been stripped before reactivation. If not completely stripped, the reactivation helps desorb hydrocarbons entrained on the catalyst.

REGENERATION

Regeneration of the large pore molecular sieve cracking catalyst and additive is conventional.

CATALYST MANUFACTURE

The large pore crystalline molecular sieve catalyst can be made using conventional techniques for mixing zeolite and matrix material.

The shape selective zeolite additive catalyst can also be made using standard techniques.

The different zeolite or molecular sieve components can be wet ball milled or dry blended together, and then may be added to a suitable matrix, e.g. a silica-alumina gel, clay composite or an alumina-clay composite or a silica sol or other matrix such as an alumina rich sol and further mixed. The matrix and zeolite mixture can be extruded, prilled, marumerized, tabletted, dropped in an oil bath, etc. to form relatively large particles. For use in fluidized bed catalytic cracking units the matrix-zeolite mixture is preferably spray dried, but any other means can be used to make a fluidizable catalyst particle, such as crushing or grinding larger size extrudates or pills.

EXAMPLES OF CATALYST PREPARATION

The large pore molecular sieve, bulk conversion cracking catalyst (CATALYST A) is prepared according to the procedure described next. 3000 gms of Davison Z-14US (ignited basis) in the form of an approximate 30% ballmilled slurry containing deagglomerated particles (95% <5 microns) is added to 1304 gms of 50% aluminum chlorhydrol (23% $Al_2O_3$, 8% Cl, Reheis Co.) and 2700 gms of Kaolin clay (ignited basis, Georgia Kaolin) in a 15 gallon Nalgene container containing 5996 gms of DI water. The mixture is subjected to high shear conditions using a Cowles Dissolver (Morehouse Industries; Fullerton, CA) equipped with 6.5" blade turning at 700-800 rpm for 30 minutes to prepare a pre-spray-dryer slurry. The solids content of the slurry is adjusted between 25-40% using additional DI water, as necessary. Also, the slurry pH is adjusted between 4.0-4.6 using 20% $H_2SO_4$ or 50% $NH_4OH$, as necessary. The slurry is then spray-dried at 370° F. outlet temperature. The spray dryer (Komline-Sanderson; Peapack, NJ) is operated at 5.5 psig air pressure with 0.03" nozzle at 250 cc/minute feed rate using a Moyno feed pump (Springfield, OH). The spray dried particles are calcined for 2 hours at 1000° F. in flowing air. Subsequently, the catalyst is first column exchanged with 1.0N NH₄NO₃ solution followed by a slurry exchange using a solution containing 1.5 wt % rare earth chlorides prepared from 60% AR solution, Code 1443, Davison Specialty Chemicals). Both exchanges are carried out ≃5/1, solution/catalyst weight ratio. The catalyst is next washed chloride free and then dried at 250° F. overnight before use. The nominal catalyst composition is 50% RE-USY (Z-14US) and 50% matrix (10% alumina binder, 90% clay).

The cracking/isomerization additive catalyst (CATALYST B) containing a shape selective intermediate pore zeolite is prepared according to the procedure described next.

2400 gms of NH₄ZSM-5 (ignited basis), in the form of an approximate 30% ballmilled slurry containing deagglomerated particles (95%<5 microns), is added to 1565 gms of 50% aluminum chlorhydrol (23% Al₂O₃, 8% Cl, Reheis Co.) and 3240 gms of Kaolin clay (ignited basis, Georgia Kaolin) in a 15 gallon Nalgene container containing 5996 gms of DI water. The mixture is subjected to high shear conditions using a Cowles Dissolver (Morehouse Industries; Fullerton, CA) equipped with 6.5" blade turning at 700-800 rpm for 30 minutes to prepare a pre spray-dryer slurry. The solids content of the slurry is adjusted between 25-40% using additional DI water, as necessary. Also, the slurry pH is adjusted between 4.0-4.6 using 20% H₂SO₄ or 50% NH₄OH, as necessary. The slurry is then spray-dried at 370° F. outlet temperature. The spray dryer (Komline-Sanderson; Peapack, NJ) is operated at 5.5 psig air pressure with 0.03" nozzle at 250 cc/minute feed rate using a Moyno feed pump (Springfield, OH). The spray dried particles are air calcined for 2 hours at 1000° F. in flowing air. Subsequently, the catalyst is column exchanged with 1.0N NH₄NO₃ solution using 5/1 solution/catalyst weight ratio. The catalyst is next dried at 250° F. overnight before use. The nominal catalyst composition is 40% HZSM-5 and 60% matrix (10% alumina binder, 90% clay).

The aliphatic aromatization additive catalyst (CATALYST C) containing a shape selective intermediate pore zeolite is prepared according to the procedure described next.

2400 gms of GaZSM-5 (ignited basis), in the form of an approximate 30% ballmilled slurry containing deagglomerated particles (95%<5 microns), is added to 1565 gms of 50% aluminum chlorhydrol (23% Al₂O₃, 8% Cl, Reheis Co.) and 3240 gms of Kaolin clay (ignited basis, Georgia Kaolin) in a 15 gallon Nalgene container containing 5996 gms of DI water. The mixture is subjected to high shear conditions using a Cowles Dissolver (Morehouse Industries; Fullerton, CA) equipped with 6.5" blade turning at 700-800 rpm for 30 minutes to prepare a spray-dryer slurry. The solids content of the slurry is adjusted between 25-40% using additional DI water, as necessary. Also, the slurry pH is adjusted between 4.0-4.6 using 20% H₂SO₄ or 50% NH₄OH, as necessary. The slurry is then spray-dried at 370° F. outlet temperature. The spray dryer (Komline-Sanderson; Peapack, NJ) is operated at 5.5 psig air pressure with 0.03" nozzle at 250 cc/minute feed rate using a Moyno feed pump (Springfield, OH). The spray dried particles are air calcined for 2 hours at 1000° F. in flowing air. Subsequently, the catalyst is column exchanged with 1.0N NH₄NO₃ solution using 5/1 solution/catalyst weight ratio. The catalyst is next dried at 250° F. overnight before use. The nominal catalyst composition is 40% GaZSM-5 and 60% matrix (10% alumina binder, 90% clay).

EXAMPLES IN CATALYTIC CRACKING

ILLUSTRATIVE EMBODIMENT

The following illustrative embodiment does not represent an actual experiment. It is an estimate, but one based on much other experimental work.

The illustrative embodiment is an estimate of the yields obtainable in a conventional FCC unit charging the same feed, at the same conditions, and changing only the catalyst compositions.

I. (Prior Art) The conventional catalyst represents a conventional large pore zeolite based cracking catalyst in a matrix. No ZSM-5 is present.

II. (Prior Art) Represents a conventional cracking catalyst plus 2.0 wt % HZSM-5.

III. Represents yields obtainable from a quadro caalyst, i.e., one containing 1 wt. % GaZSM-5 and 1 wt. % HZSM-5 where the total ZSM-5 content is the same as in II (above). The GaZSM-5 and HZSM-5 are present in equimolar amounts. The GaZSM-5 contains 1 wt % Ga in the ZSM-5 framework.

IV (Invention) Represents a quadro catalyst with the GaZSM-5 and HZSM-5 present in a separate particle, encapsulated in an alumina matrix.

| % of FF | Conv. (No ZSM-5) | Conv. + ZSM-5 | Conv. & GaZSM-5 & ZSM-5 | Con. & GaZSM-5/ ZSM-5 & Alumina Matrix |
|---|---|---|---|---|
| | I | II | III | IV |
| Gasoline | 51.1 | 49.5 | 49.7 | 49.7 |
| Paraffins | 22.7 | 21 | 21 | 21 |
| Olefins | | | | |
| C₆⁻ | 3.8 | 4.5 | 4.0 | 4.0 |
| C₇⁺ | 10.6 | 10.0 | 10.0 | 10.0 |
| Aromatics | 8.5 | 8.5 | 9.2 | 9.2 |
| Naphthenes | 5.5 | 5.5 | 5.5 | 5.5 |
| LCO | 16 | 16 | 16 | 16.8 |
| HCO | 8 | 8.0 | 8 | 7.2 |
| C₃⁼ + C₄⁼ | 8.7 | 10.3 | 10.1 | 10.1 |
| C₂⁻ | 3.5 | 3.5 | 3.5 | 3.5 |
| Gasoline Composition | | | | |
| Paraffins | 44.5 | 42.5 | 42.5 | 42.5 |
| Olefins | 28.0 | 29.5 | 28 | 28 |
| Naphthenes | 11 | 11 | 11 | 11 |
| Aromatics | 16.5 | 17 | 18.5 | 18.5 |
| Gasoline Octane No. | | | | |
| Research Clear | 92.6 | 93.6 | 94.0 | 94.0 |

OPTIMIZING

By varying the relative amounts of shape selective zeolite having paraffin cracking/isomerization activity to shape selective zeolite having paraffin aromatization activity, it is possible to continually change the reactions which occur in the FCC or TCC reactor.

Increasing the amount of paraffin aromatization zeolite, relative to paraffin cracking/isomerization zeolite, will increase the aromaticity of the gasoline product. This is desirable where highest octane gasoline is needed, or when more aromatics are needed to supply benzene, toluene, and xylene for petrochemical purposes.

When large amounts of aromatics in a gasoline product cannot be tolerated, e.g., as a result of governmental regulations limiting the aromatic content of the gasoline, it is possible to mimimize the aromatic content of the gasoline by dramatically reducing or eliminating the amount of paraffin aromatization zeolite present.

Further fine-tuning of "top of the barrel" conversion that occurs is possible by changing the relative amounts of paraffin cracking/isomerization zeolite and paraffin aromatization zeolite, both to each other and to the large pore molecular sieves.

Use of a physical mixture or blend of these catalysts increases the operating flexibility of catalytic cracking units. Refiners now can control the relative amounts of each type of catalyst in their unit. By controlling the ratios of B/A and C/A and B/C (where A, B and C are as defined in the example of catalyst preparation) it is possible to control both the octane number and aromaticity of the gasoline fraction produced by the cracking unit. The use of a physical mixture, or blend, of different components can be used in both fluidized catalytic cracking (FCC) and moving bed catalytic cracking (TCC) units.

The addition of a large pore zeolite catalyst is conventional, and is necessary to maintain average catalyst activity in the unit, or less frequently to remove metals-contaminated catalyst and replace it with fresh catalyst. The GaZSM-5 will be very effective for paraffin aromatization. The FCC unit will respond within 1-2 days to the influx of GaZSM-5, and produce more aromatics. Within about 7 days in the case of FCC of such a make-up regime, the catalyst mixture will primarily upgrade the top of the barrel by paraffin aromatization reactions (promoted by GaZSM-5) and a lesser amount of the upgrading will occur due to paraffin cracking/isomerization (due to HZSM-5).

Both the HZSM-5 and GaZSM-5 will promote gasoline upgrading reactions (believed to be olefin isomerization) for months after their introduction. Although this gasoline upgrading is reason enough to justify addition of ZSM-5 to catalytic cracking units, the ability to selectively control the amount of "top of the barrel" conversion that occurs is additional justification for their use.

Preferably, the shape selective zeolite additive catalysts are rich in zeolite content and deficient in matrix. Neat or binderless zeolite additive catalysts can be used, but usually it will be better to make the additive catalysts if some binder is used. Zeolites in a binder will be easier to keep in the cracking unit.

The large pore molecular sieve cracking catalysts, especially the preferred catalysts with an alumina-rich matrix, will act as a metals sink and keep the shape selective zeolites relatively free of metals. This permits use of relatively expensive and exotic zeolite additive catatysts for upgrading feeds which are so laden with metals that conventional FCC catalyst would rapidly deteriorate. Using the process of the present invention, an efficient overall catalytic cracking process can be achieved on "bottom of the barrel" feedstocks using a relatively cheap, disposable, large-pore molecular sieve catalyst to achieve bulk conversion, while using the shape selective additive catalysts to upgrade the gasoline and light gas fractions produced. The shape selective zeolites will also achieve a measure of dewaxing, or dealkylation of long alkyl chains on aromatic groups, which provide further economic justification for the use of the shape selective additive catalysts.

Thus the practice of the present invention allows efficient "top of the barrel" conversion to occur simultaneously with "bottom of the barrel" conversion. It is surprising that two such different processes could be performed efficiently in a conventional FCC or TCC unit.

By using more, or less, of the separate particle shape selective additive catalysts, it is possible to change the amount of "top-of-the-barrel" upgrading that occurs. By adjusting the ratio of, e.g., HZSM-5 to GaZSM-5 used, it is possible to alter the aliphatic/aromatic, aliphatic/olefinic and olefinic/aromatic nature of the "top-of-the-barrel" product.

It is also possible to control directly the olefin content of the FCC gasoline, by monitoring the olefin content of the FCC gasoline fraction and adjusting the amount of shape selective zeolite having a constraint index of 1-12 which promotes paraffin cracking/isomerization. In this way the olefinicity of the gasoline fraction can be directly controlled in the FCC unit.

What is claimed:

1. A process for catalytic cracking of a feed of hydrocarbons boiling in the gas oil and heavier boiling range to lighter products by contacting the feed at catalytic cracking conditions and catalytically cracking the feed to lighter products with a cracking catalyst comprising a mixture of separate particles of:
   (a) a bulk conversion cracking catalyst containing at least one component with an equivalent pore size of at least about 7 angstroms in a matrix, said bulk conversion cracking catalyst having fluidization properties which permit use in a fluidized or moving bed catalytic cracking reactor;
   (b) a light paraffin upgrading catalyst comprising at least one zeolite having a constraint index of 1-12 and paraffin cracking/isomerization activity; and,
   (c) a light paraffin upgrading catalyst comprising at least one zeolite having a constraint index of 1-12 and paraffin aromatization activity; and
   wherein said upgrading catalysts have substantially the same fluidization properties as the bulk conversion cracking catalyst.

2. A process for catalytic cracking of a feed of hydrocarbons boiling in the gas oil and heavier boiling range to lighter products including gasoline and light olefins in a riser cracking reactor by contact with a circulating inventory of catalytic cracking catalyst and catalytically cracking the feed to lighter products and wherein the light olefins produced during catalytic cracking are converted in the riser reactor to additional gasoline boiling range components, and wherein the gasoline product produced by cracking in the riser reactor is upgraded in the riser reactor to increase its octane number, said process comprising:
   (a) contacting said feed with catalyst mixture comprising a cracking catalyst having fluidization properties and containing at least one large pore molecular sieve in a matrix, and separate particles of additive catalysts having essentially the same fluidization properties as the cracking catalyst, said additive catalysts comprising (1) a shape selective zeolite having a constraint index of 1-12, being substantially free of hydrogenation/dehydrogenation components, and having paraffin cracking/isomerization activity in a matrix and (2) a shape selective zeolite having a constraint index of 1-12 and paraffin aromatization selectivity in a matrix;
   (b) determining the aromatic content of the gasoline fraction produced; and (c) adjusting the amount of the paraffin cracking/isomerization additive catalyst relative to the amount of the paraffin aromatization additive catalyst in the circulating catalyst inventory to change the aromaticity of the gasoline fraction produced during riser cracking.

3. A process for catalytic cracking of a feed of hydrocarbons boiling in the gas oil and heavier boiling range to lighter products including gasoline and light olefins in a riser cracking reactor by contact with a circulating inventory of catalytic cracking catalyst and catalytically cracking the feed to lighter products and wherein the light olefins produced during catalytic cracking are converted in the riser reactor to additional gasoline boiling range components, and wherein the gasoline product produced by cracking in the riser reactor is upgraded in the riser reactor to increase its octane number, said process comprising:

(a) contacting said feed with catalyst mixture comprising a cracking catalyst having fluidization properties and containing at least one large pore molecular sieve in a matrix, and separate particles of additive catalysts having essentially the same fluidization properties as the cracking catalyst, said additive catalysts comprising (1) a shape selective zeolite having a constraint index of 1–12, being substantially free of hydrogenation/dehydrogenation components, and having paraffin cracking/isomerization activity in a matrix and (2) a shape selective zeolite having a constraint index of 1–12 and paraffin aromatization selectively in a matrix;

(b) determining the olefin content of the gasoline fraction produced; and (c) adjusting the amount of the paraffin cracking/isomerization additive catalyst relative to the amount of the paraffin aromatization additive catalyst in the circulating catalyst inventory to change the olefinicity of the gasoline fraction produced during riser cracking.

* * * * *